Patented Jan. 22, 1946

UNITED STATES PATENT OFFICE 2,393,513

POLYVINYL ACETAL PLASTICIZED WITH A DIGLYCEROL ETHER

Franklin A. Bent, Berkeley, and Kenneth E. Marple, Oakland, Calif., assignors to Shell Development Company, San Francisco, Calif., a corporation of Delaware No Drawing. Application April 13, 1943, Serial No. 482,938

2 Claims. (Cl. 260—36)

This invention relates to organic plastic material containing certain ethers of diglycerol as plasticizers.

An object of the invention is the production of novel compositions comprising organic plastic material. Another object is the production of compositions which can be made into thin transparent films of exceptional strength, flexibility and toughness. A further object is the formation of compositions suitable for the preparation of laminated glass resistant to shattering even at low temperatures. A still further object is the provision of compositions which can be formed by calendering, extrusion or molding into films, filaments and massive shapes, and which can be used in the preparation of lacquers. Other objects will be apparent from the description given hereinafter.

These objects are accomplished in accordance with this invention by the use of selected ethers of diglycerol as plasticizers. It has been found that there can be formed from cellulose derivative and synthetic resin compositions containing saturated alkyl and alkoxy-alkyl tri-ethers and tetra-ethers of diglycerol, or the corresponding thio-ethers, clear, water-white structures of high tensile strength, toughness and flexibility, and that these properties are retained even at sub-zero temperatures.

The following examples, in which parts and percentages are given by weight, will serve to illustrate the invention:

Example I

Polyvinyl butyral resin known as "Vinylite X" was blended with 50 parts of diglycerol tri(butyl Cellosolve) ether per 100 parts of resin. A sheet was formed by the extrusion of the composition through a narrow slot in the absence of solvent. The material was perfectly clear, water-white, highly flexible and tough. A strip 8 inches long, 2½ inches wide and 0.03 inch thick was subjected to a "chill test" in which the strip was doubled over on itself to ½ its length and held at 0° F. for 4 hours. The folded edge was then placed upon a flat wooden block and struck sharply with a 1½ pound hammer. Careful examination failed to reveal the presence of any cracks or fractures. Another portion of the material was used in making safety glass which satisfactorily passed a standard break test of 0° F., 70° F. and 120° F.

Example II

A resin having the following composition:

| | Per cent |
|---|---|
| Polyvinyl butyral | 90.0 |
| Polyvinyl acetate | 2.3 |
| Polyvinyl alcohol | 7.7 | was blended on hot rolls with 75 parts of diglycerol tri(methyl isobutyl carbinyl) ether per 100 parts of resin. The composition was adhered to woven cotton fabric by calendering at 110° C. When subjected to the "chill test" as described in Example I, no fractures were observed. The material was ideal for raincoats.

Example III

A resin having the composition:

| | Per cent |
|---|---|
| Polyvinyl butyral | 70 |
| Polyvinyl acetate | 12 |
| Polyvinyl alcohol | 18 | was mixed with 10 parts of diglycerol tri(dimethyl carbinyl) ether per 100 parts of the resin in a screw mixer of the type common in the rubber industry. A portion was extruded by a screw stuffer in the form of a small tube which was found to have excellent tensile strength and flexibility. A further portion was comminuted and used for the fabrication of thick discs by compression molding in a poker chip die.

Example IV 100 parts of a polyvinyl butyral resin sold under the trade mark "Butvar" were blended with 50 parts of diglycerol tetra(methyl isobutyl carbinyl) ether, then dissolved in 600 parts of a mixture of equal proportions of acetone and methanol. The solution was cast in a thin layer upon a glass plate, the solvent was removed by evaporation and the resulting film was stripped from the glass surface. The film was used as an interlayer in a laminated glass, which satisfactorily passed the break test at 0° F.

Example V

A polyvinyl butyral resin was homogeneously mixed with diglycerol tri(methyl isobutyl carbinyl) ether in the proportion of 2 parts of resin to one of the ether. Safety glass was formed by the autoclave method, using an extruded sheet of the composition as interlayer, without added adhesive. When the glass laminae of the safety glass were broken with a hammer at room temperature, the interlayer adhered perfectly to the separate pieces. The test was repeated at 0° F. and at 120° F. with the same result. An unbroken section of the safety glass was exposed to weathering under accelerated conditions. At the end of six months substantially no discoloration was apparent and there was no separation of the edges of the laminae.

Example VI

A resin having the composition as determined by analysis:

| | Per cent |
|---|---|
| Polyvinyl butyral | 90.0 |
| Polyvinyl acetate | 5.3 |
| Polyvinyl alcohol | 4.7 | was mixed with 30 parts of diglycerol tri(methyl isobutyl carbinyl) ether and 20 parts of methyl ethyl ketone per 100 parts of the resin. The composition was adhered to woven nylon fabric by calendering on heated rolls. When subjected to the "chill test" as described in Example I, no fractures were observed.

Example VII

"Vinylite X" (polyvinyl butyral resin) was blended with 30 parts of diglycerol tri(methyl isobutyl carbinyl) ether and 30 parts of diglycerol tri(butyl cellosolve) ether per 100 parts of resin. The clear, homogeneous, water-white composition was formed into a sheet and subjected to the "chill test," as described in Example I. Safety glass having an interlayer of the composition behaved similarly to that of Example V.

The compositions of the present invention are homogeneous mixtures of organic plastic material and tri-ethers or tetra-ether, or the corresponding thio-ethers, of diglycerol. Examples of the plastics which may be used are cellulose nitrate, cellulose acetate, cellulose acetopropionate, cellulose acetobutyrate, ethyl cellulose, benzyl cellulose, urea-formaldehyde, phenol-formaldehyde, alkyd resins, polystyrene, polyvinyl acetate, copolymers of vinyl acetate and vinyl chloride, polyvinyl acetals and acrylic resins, such as polymethyl methacrylate.

The preferred plastics are the polyvinyl acetal resins, which can be produced by the partial or complete hydrolysis of a polyvinyl ester, followed by the condensation of the resulting polyvinyl alcohol with an aldehyde. In this application the term "acetal" is used to designate also mixed acetals, ketals, and mixed acetal-ketals. Mixed acetals can result from the condensation of polyvinyl alcohol with more than one aldehyde. Ketal formation can involve condensation with a ketone or interchange with another ketal. The most valuable polyvinyl acetal resins produced at the present time are those in which the major proportion of the acetal groups are formed from butyraldehyde. Polyvinyl butyraldehyde acetal resins are used extensively as safety glass interlayers, for which purpose those resins are selected in which the acetal content is between about 42% and about 83% by weight, calculated as polyvinyl butyral.

Diglycerol is the compound otherwise known as glyceryl ether and diglyceryl ether. The plasticizers of the invention may be represented by the semi-structural formula:

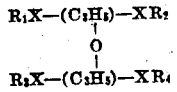

wherein X is O or S, $R_1$, $R_2$ and $R_3$ are the same or different alkyl or alkoxy-alkyl radicals, and $R_4$ is hydrogen or an organic radical, such as alkyl, alkoxy-alkyl, alkenyl, aralkyl, aryl, acyl, alicyclic, alicarbocyclic and heterocyclic radicals. Specific examples of organic radicals are methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, hallyl-phenyl, triallyl-naphthyl, naphthylallyl, 2-phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothiohyl, octyl carbothionyl, decyl carbothionyl, etc. Further, these radicals may be substituted with other elements or groups as halogen, hydroxyl, amino, nitro, carbonyl, sulfo, cyano, etc. For example, such substituted radicals may be chlorobutyl, bromo-octyl, nitro-ethyl, hydroxy-cyclohexyl, nitrobenzyl, chlorallyl, chlorobenzoyl, tetrahydrofurfuryl, hydroxyethyl, dihydro-isophoryl, sulfo-ethyl, benzene sulfonyl, cyanoacetyl, etc.

A preferred sub-group of plasticizers consists of those wherein X represents O, $R_4$ is hydrogen, and the sum of the number of carbon atoms in the alkyl and/or alkoxy-alkyl radicals is at least 12. They are highly compatible with vinyl acetal resins, have low volatility and, when present in the proper quantity, impart to compositions containing them other characteristics which are important in safety glass interlayers. Examples of preferred plasticizers are diglycerol tricellosolve ether, diglycerol tri(propyl cellosolve) ether, diglycerol tri(butyl cellosolve) ether, diglycerol tri(ethoxy isobutyl cellosolve) ether, diglycerol tri(β-butoxy ethyl) ether, diglycerol tri(butoxy propyl) ether, diglycerol tri(butoxy butyl) ether, diglycerol tri(diethyl carbinyl) ether, diglycerol tri(methyl propyl carbinyl) ether, diglycerol tri(methyl isobutyl carbinyl) ether and diglycerol tri(ethyl isopropyl carbinyl) ether. Included within the scope of the invention are mixed ethers, such as diglycerol di(methyl isobutyl carbinyl) isopropyl ether, diglycerol di(butyl isobutyl carbinyl) butyl ether, diglycerol (methyl isobutyl carbinyl) diisobutyl ether and diglycerol di(isobutyl cellosolve) butyl ether.

The two ($C_3H_5$) units in the diglycerol derivatives may be joined through the ether linkage in any of three ways: (1) between two alpha carbon atoms; (2) between two beta carbon atoms; or (3) between an alpha and a beta carbon atom. These structures are mutually isomeric and are all operable in accordance with the invention.

It is not essential that the substances employed as plasticizers be pure compounds. Commercial preparations containing impurities are satisfactory in many plastics. Mixtures of structural isomers have been found to have a plasticizing effect equal to or greater than the refined products in a number of cases.

In the case of the polyvinyl acetals the plasticizer may be incorporated with the resin by mixing with the polymer prior to or during the step of condensation with the aldehyde. With all plastics it may be conveniently added by grinding, mixing or milling, or by the use of heated rolls. Volatile solvents may be used to facilitate blending, particularly where the preparation of coating compositions is involved.

The amount of plasticizer employed may vary widely according to the nature of the resin and the intended use of the composition. Molded articles ordinarily require less plasticizer than coating compositions and safety glass interlayers. Amounts of the hereinabove mentioned derivatives of diglycerol as small as 5% by weight of the total composition impart noticeable plasticity thereto. On the other hand, complete compatibility and freedom from exudation characterize compositions in which the plasticizer is present in an amount as great as 75% by weight of the total. For safety glass interlayers the amount of plasticizer will ordinarily vary from about 25% to about 45% by weight of the total composition.

The plasticizers of the invention may be used singly, in conjunction with one another, or with small amounts of other plasticizers. Where molding, coating and impregnating compositions are involved, there may be added titanium dioxide, zinc oxide, carbon black, wood flour and other common pigments and fillers, as well as dyes and other modifiers. Polyvinyl acetal resin is advantageously stabilized against decomposition by the addition of a small amount of an organic base or other stabilizing substance known to those skilled in the art.

The compositions of the present invention find use in a variety of applications. In granular and pellet form they serve for compression and injection molding. Filaments and films may be formed by dry or wet spinning in the presence or absence of solvent. Solutions of the compositions may be cast in thin layers upon a polished surface, followed by the evaporation of the solvent. Films so formed find use as supports for light-sensitive photographic emulsions, for wrapping tissues and for the manufacture of shatter-proof glass.

Shaped structures comprising polyvinyl acetal resins plasticized with saturated alkyl and alkoxy-alkyl tri-ethers of diglycerol are clear and water-white. They possess high tensile strength and flexibility even at low temperatures. The polyvinyl butyral compositions included within the ambit of this invention display remarkable adhesiveness for glass in the preparation of safety glass sandwiches with heat and pressure in accordance with any of the usual methods. This adhesiveness is retained even at sub-zero temperatures.

Solutions of compositions comprising polyvinyl acetals and alkyl and alkoxy-alkyl tri-ethers of diglycerol are used for the coating and impregnating of fabric. Material so formed is ideally adapted for the manufacture of raincoats, tents and other articles which are required to be water-proof. For this purpose, it is preferred to modify the resin by the incorporation of a small amount of a thermosetting resin.

We claim as our invention:

1. A composition comprising a polyvinyl acetal resin and a diglycerol trialkyl ether.

2. A composition comprising polyvinyl butyral resin and diglycerol tri(methyl isobutyl carbinyl) ether.

FRANKLIN A. BENT.
KENNETH E. MARPLE.